(12) United States Patent
Bostick et al.

(10) Patent No.: US 9,684,357 B2
(45) Date of Patent: Jun. 20, 2017

(54) PREDICTIVE ELECTRICAL APPLIANCE DEVICE POWER MANAGEMENT MODE BASED ON PRESENCE DETECTION OF MOBILE DEVICE

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Sarbajit K. Rakshit, Kolkata (IN); Kimberly G. Starks, Nashville, TN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 155 days.

(21) Appl. No.: 14/631,121

(22) Filed: Feb. 25, 2015

(65) Prior Publication Data

US 2016/0246353 A1 Aug. 25, 2016

(51) Int. Cl.
*G06F 1/32* (2006.01)
(52) U.S. Cl.
CPC ............ *G06F 1/3231* (2013.01); *Y02B 60/50* (2013.01)
(58) Field of Classification Search
CPC .............................. G06F 1/3231; G06F 1/3296
USPC ........................................................ 713/323
See application file for complete search history.

(56) References Cited

U.S. PATENT DOCUMENTS

| 7,152,172 | B2 | 12/2006 | Tsirkel et al. |
| 2005/0225427 | A1* | 10/2005 | Bell ........................ G06F 21/35 340/5.2 |
| 2007/0245163 | A1 | 10/2007 | Lu et al. |
| 2009/0150194 | A1 | 6/2009 | Keohane et al. |
| 2010/0042857 | A1 | 2/2010 | Zommer |
| 2013/0227314 | A1 | 8/2013 | Burg et al. |
| 2014/0149758 | A1 | 5/2014 | Rajkotia |

(Continued)

OTHER PUBLICATIONS

"Sleep Mode"., http://en.wikipedia.org/wiki/Sleep_mode, Jun. 24, 2014, 4 pages.

(Continued)

*Primary Examiner* — Vincent Tran
(74) *Attorney, Agent, or Firm* — Lisa J. Ulrich; Andrew M. Calderon; Roberts Mlotkowski Safran Cole & Calderon, P.C.

(57) ABSTRACT

Approaches are provided for a predictive electrical appliance power-saving management mode. An approach includes ascertaining a location and pace of a mobile device. The approach further includes calculating an amount of time that it will take to enable or start programs and services upon a computing device waking from a sleep mode or hybrid sleep mode. The approach further includes determining a distance threshold to the computing device that allows for the calculated amount of time to pass such that the programs and services are enabled or started prior to a user of the mobile device arriving at the computing device when the user is returning to the computing device at the ascertained pace. The approach further includes sending a signal to awaken the computing device from the sleep mode or hybrid sleep mode when the mobile device is within the distance threshold.

20 Claims, 6 Drawing Sheets

(56) References Cited

U.S. PATENT DOCUMENTS

| | | | | |
|---|---|---|---|---|
| 2014/0265566 A1* | 9/2014 | Nguyen | ............... | H02J 7/0068 |
| | | | | 307/23 |
| 2015/0150101 A1* | 5/2015 | Novack | .............. | G07C 9/00111 |
| | | | | 726/7 |
| 2015/0381740 A1* | 12/2015 | Gwin | .................... | H04L 67/142 |
| | | | | 709/228 |
| 2016/0034050 A1* | 2/2016 | Ady | ...................... | G06F 3/0346 |
| | | | | 345/619 |
| 2016/0223998 A1* | 8/2016 | Songkakul | ............. | G05B 15/02 |

OTHER PUBLICATIONS

Dachis, "How to Automatically Unlock Your Gadgets without a Password", http://lifehacker.com/how-to-make-your-smartphone-automatically-unlock-your-s-510592193, Jun. 24, 2014, 12 pages.
Adnan, "Proximity Based Power Management in PC using Bluetooth Mobile", University of California, San Diego CA, Dec. 12, 2009, 4 pages.
How to (Un) Lock Your PC by Being Nearby (with a Bluetooth Phone)., http://www.howtogeek.com/67556/., Jun. 24, 2014, 4 pages.
Garrett, "Powering Down", Smart power management is all about doing more with the resources we have, vol. 51 No. 9 Sep. 2008, 5 pages.
Unknown,"Autonomous Learning Algorithm for Power Management".,IPCOM000185155D, An IP.com Prior Art Database Technical Disclosure, Publication Date Jul. 14, 2009, 5 pages.
Unknown,"Dynamic Power Management", IPCOM000178130D, An IP.com Prior Art Database Technical Disclosure, Publication date Jan. 16, 2009, 4 pages.

* cited by examiner

PREDICTIVE ELECTRICAL APPLIANCE DEVICE POWER MANAGEMENT MODE BASED ON PRESENCE DETECTION OF MOBILE DEVICE

FIELD OF THE INVENTION

The present invention generally relates to power-saving management of an electrical appliance, and more particularly, to systems and methods for a predictive electrical appliance power-saving management mode that is based on presence detection of a mobile device.

BACKGROUND

Power management is a feature of many electrical appliances, especially copiers, computing devices, and computing device peripherals such as monitors and printers, that turns off the power or switches the system to a low-power state when inactive. The power management modes of a typical electrical appliance such a computing device include a sleep mode, a hibernate mode, and a hybrid sleep mode. Sleep mode is a power-saving state where all actions on the computing device are stopped and any open documents and applications are put in memory. A user can wake the computing device and resume work from sleep mode. The hibernate mode saves open documents and running applications to the hard disk and shuts down the computing device. Once the computing device is powered back on, the computing device will resume everything where left off. The hybrid sleep mode is a combination of the sleep and hibernate modes and puts any open documents and applications both in memory and on the hard disk, and then puts the computing device into a low-power state, allowing a user to wake the computing device and resume work.

The sleep mode and hybrid sleep mode are useful for many users that want to stop using the computing device for a short period of time (e.g., restroom or lunch break, completion of tasks that do not require the computing device, etc.) but want to be able to wake the computing device and resume use of the computing device. During those breaks of a short period of time, either by switch, or based on a configured schedule, the computing device may be put to sleep. During sleep mode and hybrid sleep mode, multiple applications or services of the computing device are stopped automatically to manage power consumption. Once the user returns to the computing device, the user can wake the computing device from sleep mode or hybrid sleep mode, which restarts the applications or services of the computing device. This restart of the applications or services on the computing device takes time to fully complete and may impart time inefficiencies into a user's work or personal schedule.

SUMMARY

In a first aspect of the invention, a method is provided for that includes activating sleep mode or hybrid sleep mode of a computing device. The method further includes ascertaining a location and pace of one or more mobile devices configured to communicate with the computing device. The method further includes determining programs and services that are to be enabled or started upon the computing device waking from the sleep mode or hybrid sleep mode. The method further includes determining a distance threshold to the computing device that allows for a calculated amount of time to pass such that the determined programs and services are enabled or started prior to a user of the one or more mobile devices arriving at the computing device when the user is returning to the computing device at the ascertained pace. The method further includes determining whether the one or more mobile devices is within the determined distance threshold based on the ascertained location of the one or more mobile devices. The method further includes that when the one or more mobile devices is within the determined distance threshold, awaken the computing device from the sleep mode or hybrid sleep mode and begin enabling and starting the programs and services.

In another aspect of the invention, a computer program product is provided for awakening a computing device from a sleep mode or hybrid sleep mode. The computer program product includes a computer readable storage medium having program instructions embodied therewith. The computer readable storage medium is not a transitory signal per se, and the program instructions are readable by a computing device to cause the computing device to perform a method that includes ascertaining a location and pace of one or more mobile devices configured to communicate with the computing device. The method further includes determining programs and services that are to be enabled or started upon the computing device waking from a sleep mode or hybrid sleep mode. The method further includes calculating an amount of time that it will take to enable or start the determined programs and services upon the computing device waking from the sleep mode or hybrid sleep mode. The method further includes determining a distance threshold to the computing device that allows for the calculated amount of time to pass such that the determined programs and services are enabled or started prior to a user of the one or more mobile devices arriving at the computing device when the user is returning to the computing device at the ascertained pace. The method further includes determining whether the one or more mobile devices is within the determined distance threshold based on the ascertained location of the one or more mobile devices. The method further includes that when the one or more mobile devices is within the determined distance threshold, sending a signal to awaken the computing device from the sleep mode or hybrid sleep mode such that the computing device will begin enabling and starting the programs and services.

In a further aspect of the invention, a system is provided for that includes a CPU, a computer readable memory and a computer readable storage medium. The system further includes program instructions to configure a power management tool of a computing device to place the computing device in a sleep mode or a hybrid sleep mode upon one or more actions occurring. The system further includes program instructions to configure a sleep tool of the computing device to communicate with one or more mobile devices of a user of the computing device. The system further includes program instructions to configure the one or more mobile devices to communicate with the sleep tool. The system further includes program instructions to activate the sleep mode or hybrid sleep mode of the computing device. The system further includes program instructions to ascertain a location and pace of the one or more mobile devices configured to communicate with the computing device. The system further includes program instructions to determine programs and services that are to be enabled or started upon the computing device waking from the sleep mode or hybrid sleep mode. The system further includes program instructions to calculate an amount of time that it will take to enable or start the determined programs and services upon the computing device waking from the sleep mode or hybrid sleep mode. The system further includes program instructions to determine a distance threshold to the computing device that allows for the calculated amount of time to pass such that the determined programs and services are enabled or started prior to the user arriving at the computing device when the user is returning to the computing device at the ascertained pace. The system further includes program instructions to determine whether the one or more mobile devices is within the determined distance threshold based on the ascertained location of the one or more mobile devices. The system further includes program instructions to awaken the computing device from the sleep mode or hybrid sleep mode and begin enabling and starting the programs and services when the one or more mobile devices is within the determined distance threshold. The program instructions are stored on the computer readable storage medium for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
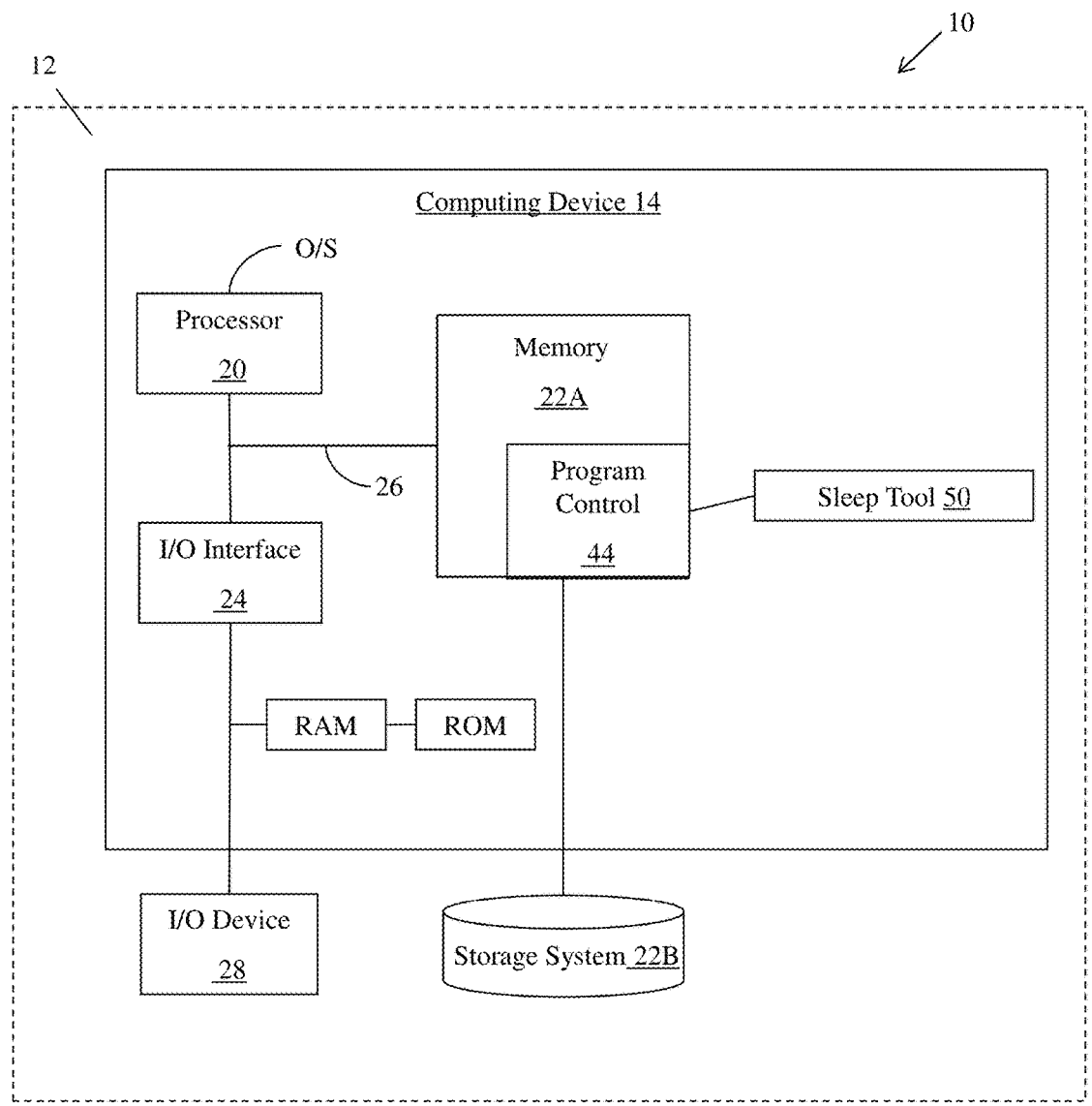
FIG. 1 shows an illustrative environment for implementing the steps in accordance with aspects of the invention.

The present invention generally relates to power-saving management of an electrical appliance, and more particularly, to systems and methods for a predictive electrical appliance power-saving management mode that is based on presence detection of a mobile device. More specifically, implementations of the invention provide systems and methods that put an electrical appliance, e.g., a computing device, into a sleep mode or hybrid sleep mode based on manual activation, user preferences, or by elapsed automatic settings, and wake the electrical appliance based on a location, a traveling speed, and/or a direction of travel of the user's mobile device relative to the electrical appliance. In embodiments, the placing the electrical appliance into the sleep mode or hybrid sleep mode includes disabling and/or stopping active programs and/or services on the electrical appliance, and the waking of the electrical appliance includes enabling and/or restarting the programs and/or services on the electrical appliance such the programs and/or services on the electrical appliance are substantially or completely restarted by the time the user arrives back at the electrical appliance. The present invention provides many advantages over conventional sleep modes and hybrid sleep modes, which do not wake an electrical appliance based on a location, a traveling speed, and/or a direction of travel of the user's mobile device relative to the electrical appliance.

As use herein the term "program" should be understood by those of ordinary skill in the art to mean a set of computer instructions that work together to tell the computing device what to perform (e.g., a software tool, app, or application used to command the computing device to perform tasks on a user's behalf). As used herein the term "service" should be understood by those of ordinary skill in the art to mean the tasks or work performed by a set of computer instructions (e.g., the tasks or work that a program tells the computing device to perform is the service). As use herein the term "enable" should be understood by those of ordinary skill in the art to mean to make a feature or capability available for use (e.g., in a control panel of a computing device a user may enable a setting to turn on WiFi, which allows the machine to connect to a WiFi connection that is in range when prompted and confirmed). As use herein the term "disable" should be understood by those of ordinary skill in the art to mean to cause a feature or capability to be unavailable for use (e.g., to use the WiFi example a user may select an option to make the WiFi feature unavailable for use by the computer). As use herein the term "start" should be understood by those of ordinary skill in the art to mean to begin in a specific manner (e.g., turn on a set of computer instructions). As use herein the term "stop" should be understood by those of ordinary skill in the art to mean to end in a specific manner (e.g., turn off a set of computer instructions).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows an illustrative environment 10 for managing the processes in accordance with the invention. To this extent, environment 10 includes a server 12 or other computing system that can perform the processes described herein. In particular, server 12 includes a computing device 14. The computing device 14 can be resident on a network infrastructure or computing device of a third party service provider (any of which is generally represented in FIG. 1).

The computing device 14 also includes a processor 20 (e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with external I/O device/resource 28 and storage system 22B. For example, I/O device 28 can comprise any device that enables an individual to interact with computing device 14 (e.g., graphic user interface) or any device that enables computing device 14 to communicate with one or more other computing devices using any type of communications link. The external I/O device/resource 28 may be for example, a handheld device, PDA, handset, keyboard etc.

In general, processor 20 executes computer program code (e.g., program control 44), which can be stored in memory 22A and/or storage system 22B. Moreover, in accordance with aspects of the invention, program control 44 controls a sleep tool 50, which performs processes described herein. The sleep tool 50 can be implemented as one or more program code in program control 44 stored in memory 22A as separate or combined modules. Additionally, the sleep tool 50 may be implemented as separate dedicated processors or a single or several processors to provide the function of the sleep tool 50. While executing the computer program code, the processor 20 can read and/or write data to/from memory 22A, storage system 22B, and/or I/O interface 24. The program code executes the processes of the invention.

The bus 26 provides a communications link between each of the components in computing device 14.

By way of example, the sleep tool 50 may be configured to provide the functionality of determining programs and/or services that should be enabled and/or restarted upon the computing device 14 awakening from a sleep mode or a hybrid sleep mode. In embodiments, the sleep tool 50 may be further configured to ascertain the location, pace or speed of travel, and/or direction of travel of one or more mobile devices. In additional embodiments, the sleep tool 50 may be further configured to provide the functionality of: (i) calculating an amount of time that it may take to enable and/or restart each of the programs and/or services upon the computing device 14 awakening from the sleep mode or hybrid sleep mode; (ii) calculating and setting an enablement threshold that would allow enough time for the computing device 14 to awaken from the sleep mode or hybrid sleep mode and have the programs and/or services that were disabled or stopped substantially or completely enabled and/or restarted prior to a user of the one or more mobile devices arriving at the computing device 14 when the user is returning to the computing device at a certain pace; (iii) determining when the one or more mobile devices is within the set enablement threshold; and (iv) when the one or more mobile devices is within the set enablement threshold, notifying the computing device 14 to awaken and start enabling and/or restarting the programs and/or services.

The computing device 14 can comprise any general purpose computing article of manufacture capable of executing computer program code installed thereon (e.g., a personal computer, a mobile device, a server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, server 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
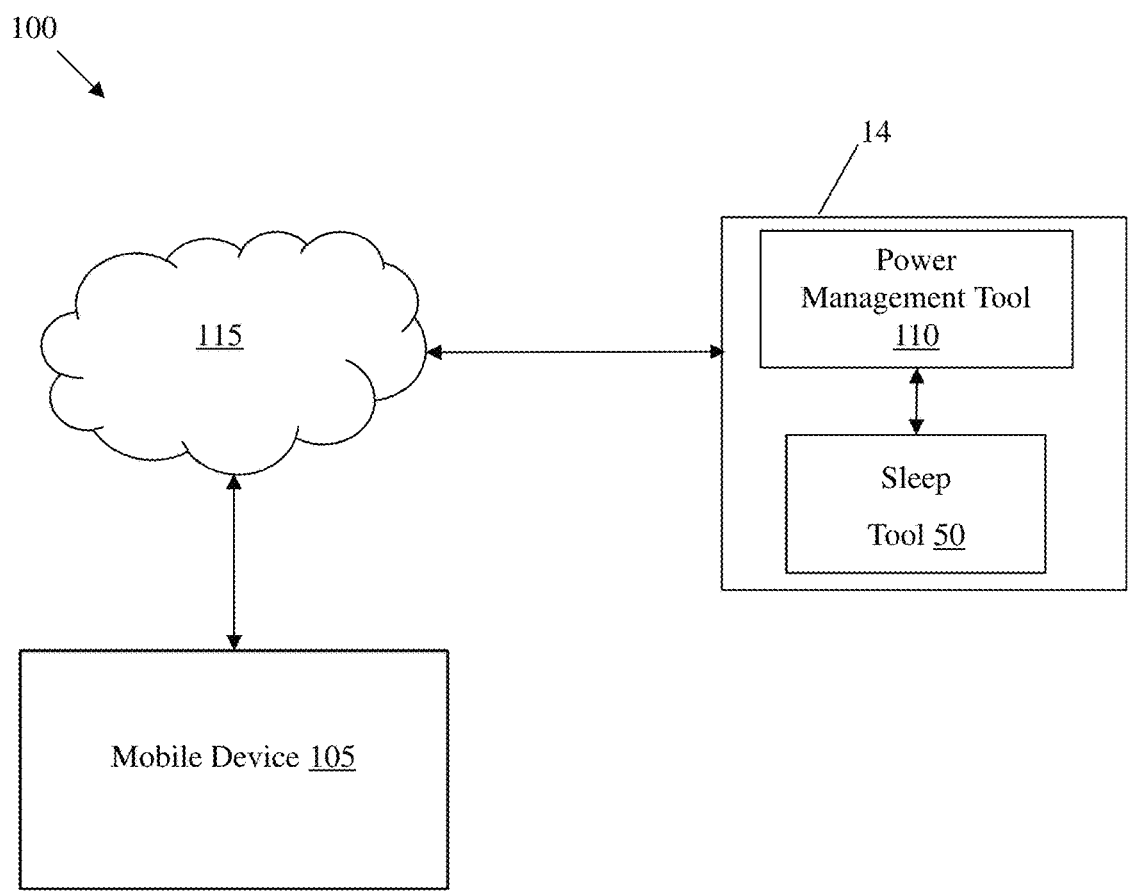
FIG. 2 shows a high level architecture for implementing processes in accordance with aspects of the invention.

FIG. 2 is a high level architecture for implementing processes in accordance with aspects of the present invention. More specifically, FIG. 2 depicts a power-saving management system 100 comprising a computing device 14 with the sleep tool 50 (e.g., as described in detail with respect to FIG. 1) and power management tool 110 in communication with one or more mobile devices 105 via a communication pathway 115. The one or more mobile devices 105 is associated with one or more users of the computing device 14, and may be, for example, a small computing device such as a smartphone, personal digital assistant, tablet, laptop, handheld gaming console, wearable technology (e.g., a smart watch), portable media player, etc. The communication pathway 115 is any pathway that allows for the computing device 14 to communicate with and/or detect the presence the one or more mobile devices 105, and may be, for example, a computer network such as the Internet, a local area network, a wide area network, a wireless network, etc., and/or a proximity sensing pathway such as an electromagnetic field, capacitive coupling, radio or sound wave, etc.

In embodiments, the one or more mobile devices 105 is configured to communicate with the computing device 14 using in range technology options. For example, the one or more mobile devices 105 may be connected to the computing device 14 through communication pathway 115 via a wide area wireless technology such as a telecommunications network or the Internet, a local area wireless technology such as infrared or WiFi, or a short range wireless technology such a Bluetooth®. It should be understood by those of ordinary skill in the art that the present invention is not limited by the type of mobile device or the mode of communication between the mobile device and the computing device, and a variety of types of mobile devices may be configured to communicate with the computing device in a variety of ways without departing from the spirit and scope of the present invention.

Figure 3:
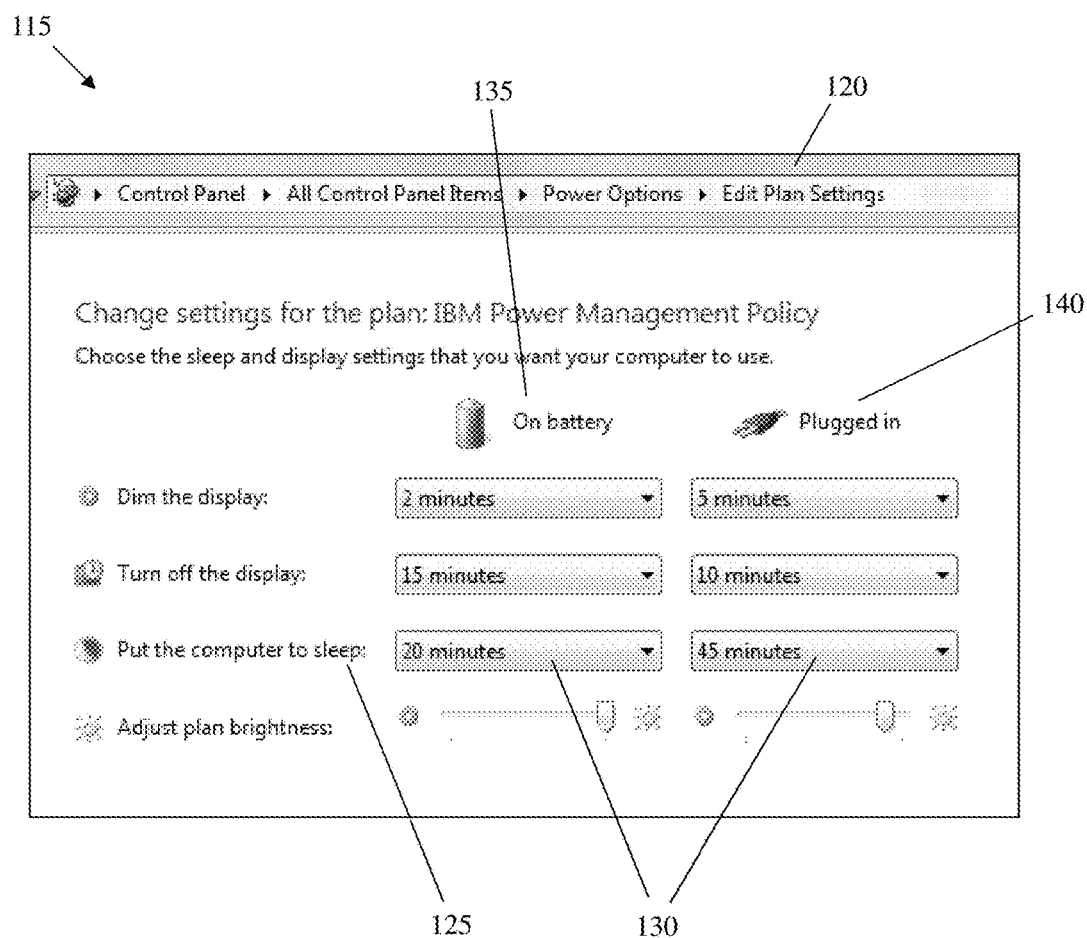
FIGS. 3 and 4 show visual representations of examples of operation in accordance with aspects of the invention.

In embodiments, the power management tool 110 of the computing device 14 may be configured using, for example, the onboard O/S of the computing device 14. As shown in FIG. 3, configuring power management tool 110 may comprise a user accessing the power management tool 110 via a user interface 120 and selecting when the computing device 14 should be put into a sleep mode 125 or a hybrid sleep mode (not shown), e.g., after a set predetermined amount of time 130, for example, 20 or 45 minutes. In embodiments, the activation of the sleep mode 125 may be selected for various states of the computing device 14, e.g., a battery power supply status 135 versus a plugged in power supply status 140.

During normal operation, the computing device 14 maintains all active data such as open documents, programs, and services in the RAM. The sleep mode 125 is a low power consumption state in which the computing device 14 shuts down most components of the computing device 14 except for at least the RAM and the sleep tool 50. Because sleep mode 125 keeps active data stored in RAM, this means that as long as power from the battery or plug remains available, the computing device 14 can remain in a sleep state indefinitely while protecting user data that was active at the time of sleep mode 125. If power is lost at any time, however, data that was stored only in RAM may be lost. Upon activation of the computing device 14 from the sleep mode 125, the active data is retrieved from the RAM and the documents, programs, services, and components are activated and restored. Unlike sleep mode 125, which keeps active data stored only in the RAM, hybrid sleep mode writes active data to the RAM (like standard sleep) and the hard drive (like a hibernation mode), and maintains low levels of power to some components such as at least the RAM and the sleep tool 50. This allows for the computing device 14 to shut down most components of the computing device 14 except for at least the RAM and the sleep tool 50 (low power consumption), while also protecting user data with a copy on the hard drive in the event of a power failure.

In embodiments, the sleep tool 50 may be installed or implemented on the computing device 14 within the O/S or as a standalone application or module, and made available (e.g., made available as a service) to the computing device 14 by way of an application programming interface (API) framework. The API framework defines a set of functionalities of the sleep tool 50 that are independent of their respective implementation, allowing both definition and implementation to vary without compromising each other. The API framework is used to allow for the integration of new functionality into the computing device 14, or to share data between the computing device and the sleep tool 50.

In embodiments, the sleep tool 50 works with the computing device 14 to determine what programs and/or services should be disabled during sleep mode or hybrid sleep mode, when to disable those programs and/or services based on a current processing state of the computing device 14, and the number and type of program and/or services to be stopped. For example, the sleep tool 50 may work with the computing device 14 to determine display options, such as whether the display should be shut off, how to subdue the display lighting, or whether to display a clock during the sleep mode or hybrid sleep mode. The sleep tool 50 may also work with the computing device 14 to determine whether certain network connectivity should be suppressed during the sleep mode. For example, any program and/or service using the Internet may be specified to lose connectivity to the Internet during the sleep mode or hybrid sleep mode. The sleep tool 50 may also work with the computing device 14 to determine whether the computing device's peripherals (e.g., the keyboard, mouse, printer, touch pad, etc.) should function during sleep mode or hybrid sleep mode. The sleep tool 50 may also work with the computing device 14 to determine whether software updates should be downloaded and installed during the sleep mode. The sleep tool 50 may also work with the computing device 14 to determine whether the data from certain programs or services (e.g., contacts, calendars, and the like) should be updated or synchronized with data on another device during the sleep mode or hybrid sleep mode.

The sleep tool 50 may also work with the computing device 14 to specify when to disable and/or stop the programs and/or services based on a current processing state of the computing device 14. For example, in the event that the set predetermined amount of time has expired, as monitored by the power management tool 110, the sleep tool 50 may be configured to suspend activation of the sleep mode or hybrid sleep mode by the power management tool 110 based on whether the computing device is presently processing data attributable to one or more programs and/or services. Additionally, the sleep tool 50 may be configured to initiate activation of the sleep mode or hybrid sleep mode by the power management tool 110 once the processing data attributable to the one or more programs and/or services has been completed.

In embodiments, once the computing device 14 is in sleep mode or hybrid sleep mode by manual activation, user preferences (e.g., settings configured within the power management tool 110), or by elapsed automatic settings, the sleep tool 50 will proceed to continuously or intermittently (e.g., every 10 seconds) check a location, pace or speed of travel, and/or a direction of travel of the one or more mobile devices 105. For example, the sleep tool 50 may be configured to use the computing device 14 as a proximity sensor operable to emit an electromagnetic field or a beam of electromagnetic radiation and determine changes or a return signal in the electromagnetic field or the beam of electromagnetic radiation from the one or more mobile devices 105 (i.e., a proximity sensor target). The changes or a return signal in the electromagnetic field or the beam of electromagnetic radiation from the one or more mobile devices 105 may then be used by the sleep tool 50 to determine a location and/or a proximity of the one or more mobile devices 105 with respect to the computing device 14, pace or speed of travel of the one or more mobile devices 105, and/or a direction of travel of the one or more mobile devices 105. It should be understood that control of the computing device 14 as a proximity sensor is not limited to the electromagnetic field or the beam of electromagnetic radiation, and may alternatively or additionally include other means of operation as a proximity sensor such as global positioning technology via a computer network, capacitive coupling, radio or sound wave, etc. without departing from the spirit and scope of the present invention.

In other embodiments, the one or more mobile devices 105 may be configured to continuously or intermittently (e.g., every 10 seconds) communicate the location of the one or more mobile devices 105, pace or speed of travel of the one or more mobile devices 105, and/or a direction of travel of the one or more mobile devices 105 to the computing device 14 and/or the sleep tool 50. Thereafter, the sleep tool 50 may be configured to check the location, pace, and/or direction of the one or more mobile devices 105, and determine the proximity of the one or more mobile devices 105 with respect to the computing device 14 based on the location, pace, and/or direction of the one or more mobile devices 105. The one or more mobile devices 105 may communicate the location, pace, and/or direction of the one or more mobile devices to the computing device 14 and/or the sleep tool 50 via the communication pathway 115, e.g., via a WiFi™ connection.

In embodiments, once the computing device 14 is in sleep mode or hybrid sleep mode by manual activation, user preferences (e.g., preferences setup within the sleep tool 50), or by elapsed automatic settings (e.g., settings configured within the power management tool 110), the sleep tool 50 will proceed to determine which programs and/or services should be enabled and/or restarted upon the computing device 14 awakening from sleep mode or hybrid sleep mode. For example, based on the sleep tool 50 working with the computing device 14 to determine what programs and/or services should be disabled during sleep mode or hybrid sleep mode, when to disable those programs and/or services based on a current processing state of the computing device 14, and the number and type of programs and/or services to be stopped, the sleep tool 50 can determine which programs and/or services should be enabled and/or restarted. Consequently, based on the determination of which programs and/or services should be enabled and/or restarted, the sleep tool may be further configured to calculate "t" amount of time it may take to enable and/or restart each of the programs and/or services upon the computing device 14 awakening from sleep mode or hybrid sleep mode.

Once the computing device 14 has been placed in sleep mode or hybrid sleep mode, the sleep tool 50 will proceed to calculate and set an enablement threshold. The enablement threshold is a calculated distance threshold to the computing device 14 that would allow enough time for the computing device 14 to awaken from the sleep mode or hybrid sleep mode and have the programs and/or services that were disabled or stopped substantially or completely enabled and/or restarted prior to the user of the one or more mobile devices 105 arriving at the computing device 14 when the user is returning to the computing device 14 at a certain pace (e.g., 3.5 mph). For example, the sleep tool 50 may be configured to calculate a distance "d" from the computing device 14 that would allow for the "t" amount of time to pass for the computing device 14 to awaken from the sleep mode or hybrid sleep mode and enable and/or restart the programs and/or services when the user is returning to the computing device 14 at a determined pace of "x" (e.g., 3.5 mph) such that the programs and/or services are substantially or completely enabled and/or restarted by the time the user arrives at the computing device 14. In other words, the distance "d" may be calculated as the "t" amount of time multiplied by the determined pace "s" (e.g., the distance traveled formula).

Figure 4:
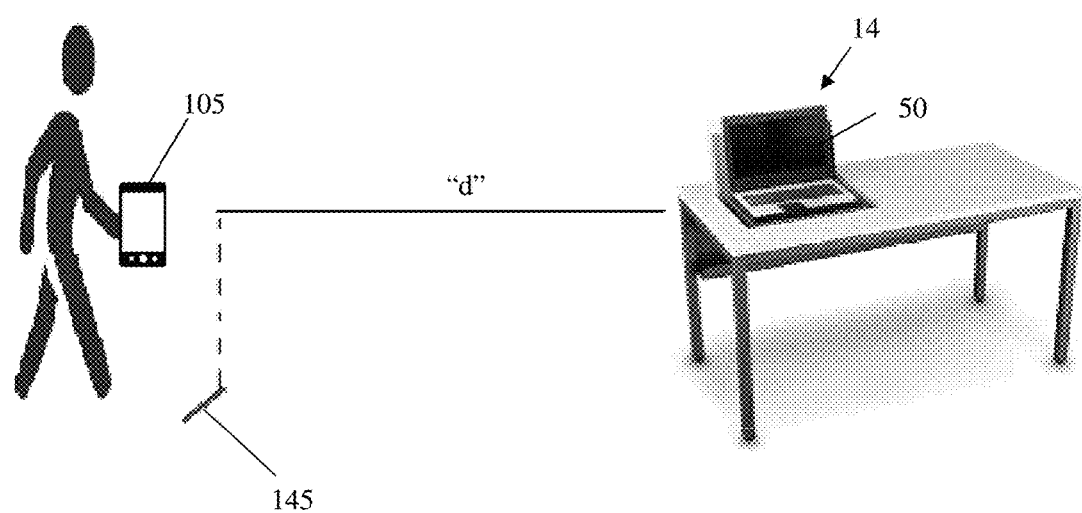

As shown in FIG. 4, the sleep tool 50 can set the enablement threshold or distance threshold 145 at distance "d" from the computing device 14 in all directions (e.g., x, y, and z) or in predetermined directions (e.g., x, y, and/or z) such that the sleep tool 50 can be made aware of when the one or more mobile devices 105 is inside or outside the enablement threshold. The awareness of the one or more mobile devices 105 inside or outside the enablement threshold and, optionally, a direction travel of the one or more mobile devices towards the computing device 14, will trigger the sleep tool 50 to signal the power management tool 110 in order to awaken the computing device 14 from the sleep mode or hybrid sleep mode and start enabling and/or restarting the programs and/or services such that the programs and/or services are substantially or completely enabled and/or restarted by the time the user arrives at the computing device 14. In embodiments, substantially enabled and/or restarted means that each of the programs and/or services are at least 80%, preferably 90%, enabled and/or restarted by the time the user arrives at the computing device 14

In additional embodiments, the sleep tool 50 may be further configured to learn over time behavior of a user, for example, details regarding a particular user's travel paths, speed of travel, and/or planned periods of time away from the computing device 14, in order to better take account of the time that it should take to awake the computing device 14 from sleep mode and substantially or completely enable and/or restart programs and/or services. For example, the sleep tool 50 may be further configured to learn over time that the user typically takes a lunch break from 12 pm to 1 pm Monday through Friday. Accordingly, the sleep tool 50 may be configured to signal the power management tool 110 at a determined time prior to 1 pm Monday through Friday in order to awaken the computing device 14 from the sleep mode or hybrid sleep mode and start enabling and/or restarting the programs or services such that the programs and/or services are substantially or completely enabled and/or restarted by the time the user arrives at the computing device 14 at 1 pm.

Alternatively, the sleep tool 50 may be further configured to learn over time that the user typically takes a quicker route (e.g., a back hallway) to return to their office from a given location. Accordingly, the sleep tool 50 may be configured to provide for an additional buffer of "x" amount of time in the calculation of the distance "d" (e.g., adding 1-3 minutes to "t" amount of time) to account for a quicker return of the user to the computing device that is independent of the determined pace "s". It should be understood to those of ordinary skill in the art that the above examples are only illustrative of the various ways in which learned user behavior can be used to improve the systems and process of the present invention, and many other ways of utilizing learned behavior are contemplated without departing from the spirit and scope of the present invention.

In embodiments, a single computer system (e.g., computing device 14) may be used by multiple users. In such an instance, the sleep tool 50 is further configured to create user profiles to match multiple mobile devices 105 to users, and learn the behavior of each user based on the one or more bile devices 105 linked for each user's profile. As such, dependent upon which user is presently using the computing device 14, the sleep tool 50 may be configured to use that particularly user's learned behavior and/or one or more mobile devices 105 to effectively awaken the computing device 14 from sleep mode and substantially or completely enable and/or restart the programs and/or services prior to the user returning to the computing device 14.

Figure 5:
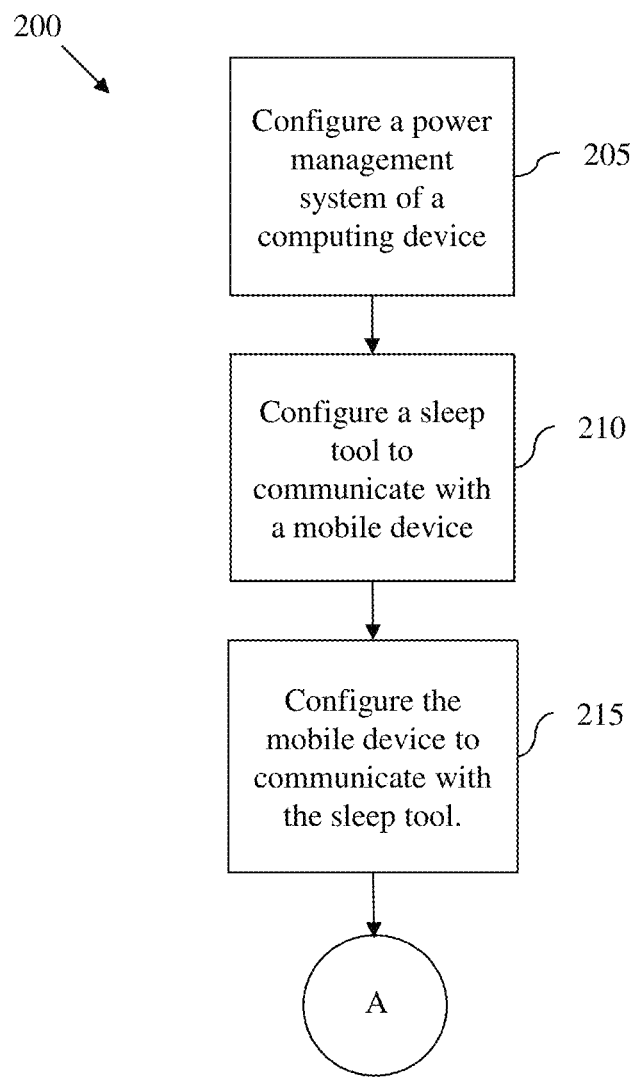
FIGS. 5 and 6 show exemplary flows in accordance with aspects of the invention.
Figure 6:
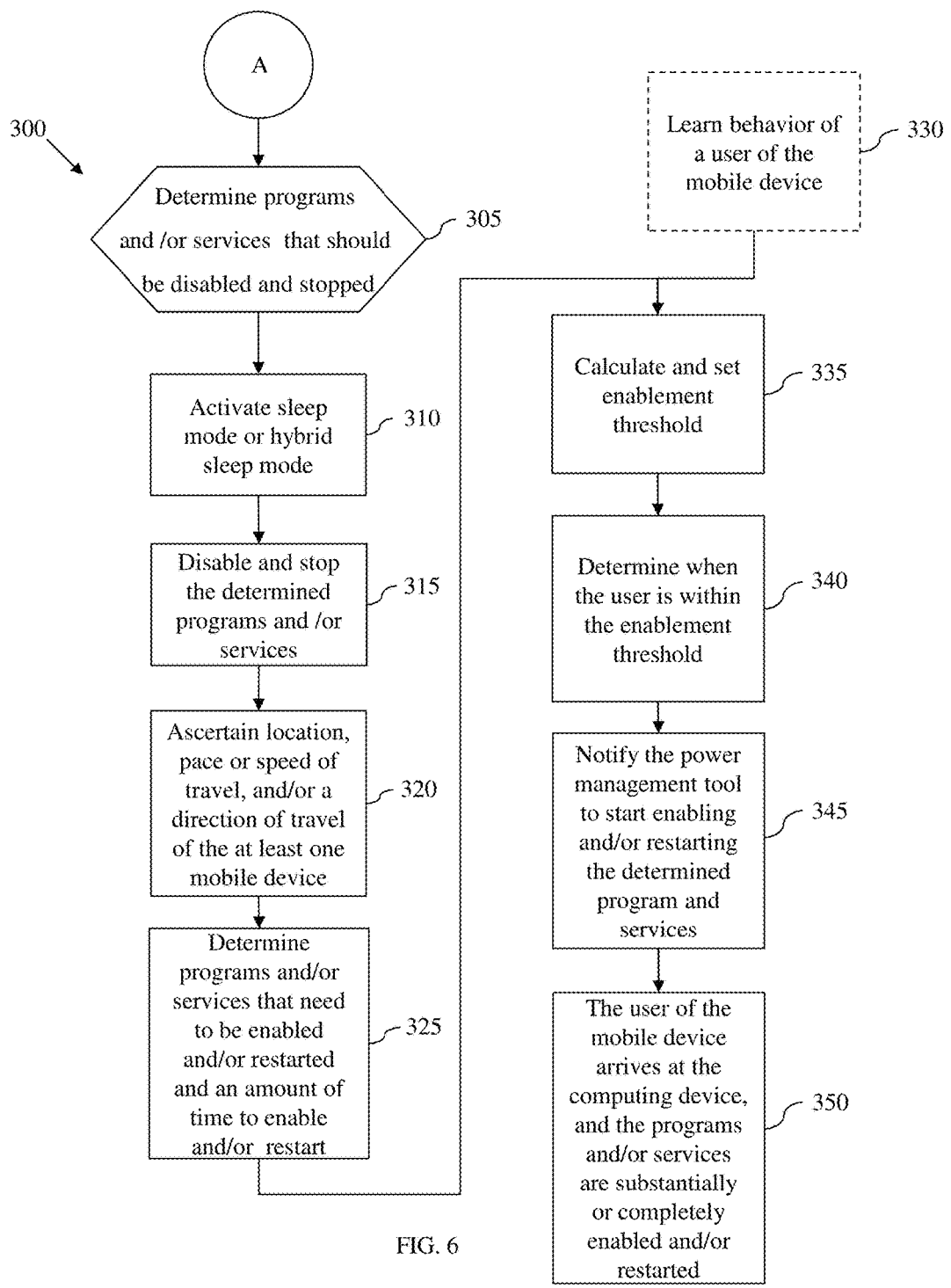

FIGS. 5 and 6 show exemplary flows for performing aspects of the present invention. The steps of FIGS. 5 and 6 may be implemented in the environment of FIGS. 1 and 2, for example. As noted above, the flowchart(s) illustrate the architecture, functionality, and operation of possible implementations of systems, methods, and computer program products as already described herein in accordance with the various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 5 is a flow diagram illustrating a process 200 for configuring one or more mobile devices, an electronic appliance, e.g., a computing device, a power management tool, and a sleep tool to operate and/or communicate with each other in accordance with aspects of the present invention. At step 205, a power management tool of the computing device is configured for managing the power of the computing device during normal operation mode, sleep mode, and/or hybrid sleep mode. For example, configuring the power management tool (e.g., the power management tool 110 as discussed with respect to FIG. 2) may include a user logging onto the computing device, accessing a user interface (e.g., graphical user interface such as a control panel for the power management tool), selecting various power schemes that most closely match how the computing device is used by the user, adjusting default settings such as selecting a length of time until the computing device is placed into a sleep mode or hybrid sleep mode, and saving such selections and settings. In embodiments, the power management tool may be configured using, for example, the onboard O/S of the computing device as shown and discussed previously with respect to FIG. 3.

At step 210, a sleep tool of the computing device is configured to communicate with the one or more mobile devices via the computing device. For example, the sleep tool (e.g., the sleep tool 50 as discussed above with respect to FIG. 2) may be configured to collect data pertaining to each user of the computing device with regard to types of mobile devices used by each user and create user profiles to match multiple mobile devices to users. In embodiments, the data collected may include any information (e.g., Bluetooth® pairing data, passwords, identifiers such as a serial number for the mobile device, model type of the mobile device, O/S information of the mobile device, communication types available to the mobile device, etc.) that would allow for the sleep tool to communicate with each of the one or more mobile devices via the computing device, and determine proximity, pace, and/or direction of the one or more mobile devices with respect to the computing device.

At step 215, the one or more mobile devices is configured to communicate with the sleep tool via the computing device. For example, the one or more mobile devices (e.g., the at least one mobile device 105 as discussed above with respect to FIG. 2) may be configured to communicate with the sleep tool via the computing device using in range technology options. In embodiments, the in range technology options may include wide area wireless technology such as a telecommunications network or the Internet, a local area wireless technology such as infrared or WiFi™, or a short range wireless technology such a Bluetooth®. It should be understood by those of ordinary skill in the art that the present invention is not limited by the type of mobile device or the mode of communication between the mobile device and the computing device, and a variety of types of mobile devices may be configured to communicate with the computing device in a variety of ways without departing from the spirit and scope of the present invention FIG. 6 is a flow diagram illustrating a process 300 for awakening a computing device from a sleep mode or hybrid sleep mode in accordance with aspects of the present invention. At step 305, determinations are made of what programs and/or services accessible on a computing device should be disabled during sleep mode or hybrid sleep mode, and the number and type of programs and/or services accessible on the computing device should be stopped. In embodiments, a sleep tool (e.g., sleep tool 50 as discussed with respect to FIG. 2) may work with the computing device to determine various options or preferences for disabling or stopping certain programs and/or services accessible on the computing device. For example, the sleep tool may work with the computing device to determine whether certain network connectivity should be suppressed during the sleep mode, whether the computing device's peripherals (e.g., the keyboard, mouse, printer, touch pad, etc.) should function during sleep mode or hybrid sleep mode, whether software updates should be downloaded and installed during the sleep mode, and/or whether the data from certain programs or services (e.g., contacts, calendars, and the like) should be updated or synchronized with data on another device during the sleep mode or hybrid sleep mode.

Additionally, at step 305, determinations are made as to when to disable the programs and/or services on the computing device based on a current processing state of the computing device. For example, the sleep tool may work with the computing device to determine to suspend activation of the sleep mode or hybrid sleep mode by the power management tool based on whether the computing device is presently processing data attributable to one or more programs and/or services. Additionally, the sleep tool may work with the computing device to initiate activation of the sleep mode or hybrid sleep mode once the processing data attributable to the one or more programs and/or services has been completed.

At step 310, sleep mode or hybrid sleep mode of the computing device is activated by manual activation, user preferences (e.g., settings configured within the power management tool 110), or by elapsed automatic settings. For example, sleep mode or hybrid sleep mode of the computing device may be activated based on the configuration of the power management tool, as discussed with respect to step 205 of FIG. 5.

At step 315, the determined programs and/or services are disabled and/or stopped. For example, the programs and/or services presently running on the computing device are disabled and/or stopped in accordance with the determinations made in step 305, and upon activation of the sleep mode or hybrid sleep mode in step 310. In embodiments, during sleep mode the active data from the programs and/or services are stored in the RAM of the computing device. In embodiments, during the hybrid sleep mode the active data from the programs and/or services are stored in the RAM and on the hard drive of the computing device (as discussed with respect to FIGS. 1 and 2).

At step 320, the location, pace or speed of travel, and/or direction of travel of one or more mobile devices are ascertained. For example, once the computing device is in sleep mode or hybrid sleep mode by manual activation, user preferences, or by elapsed automatic settings, the sleep tool will proceed to continuously or intermittently check a location, pace or speed of travel, and/or a direction of travel of the one or more mobile devices. In embodiments, the sleep tool may be configured to use the computing device as a proximity sensor to obtain the location, pace or speed of travel, and/or a direction of travel of the one or more mobile devices, as described with respect to FIG. 2. In other embodiments, the one or more mobile devices may be configured to continuously or intermittently communicate the location of the one or more mobile devices, pace or speed of travel of the one or more mobile devices, and/or a direction of travel of the one or more mobile devices to the computing device and/or the sleep tool. Thereafter, the sleep tool may be configured to check the location, pace, and/or direction of the one or more mobile devices, and determine the proximity of the one or more mobile devices with respect to the computing device based on the location, pace, and/or direction of the one or more mobile devices.

At step 325, programs and/or services that should be enabled and/or restarted upon the computing device awakening from sleep mode or hybrid sleep mode are determined, and "t" amount of time that it may take to enable and/or restart each of the programs and/or services upon the computing device awakening from the sleep mode or hybrid sleep mode is calculated. For example, the sleep tool may determine which programs and/or services need to be enabled and/or restarted upon the computing device awakening from the sleep mode or hybrid sleep mode based on the determinations made in step 305 regarding what programs and/or services should be disabled during sleep mode or hybrid sleep mode, when to disable those programs and/or services based on a current processing state of the computing device, and the number and type of program and/or services to be stopped. In embodiments, the sleep tool can calculate "t" amount of time it may take to enable and/or restart each of the programs and/or services upon the computing device awakening from sleep mode or hybrid sleep mode based on the determination of which programs and/or services need to be enabled and/or restarted.

At step 330, behavior of a user, for example, details regarding a particular user's travel paths and planned periods of time away from the computing device are optionally obtained and analyzed. For example, the sleep tool may be configured to learn over time that a particular user typically takes a break during certain periods of time and certain days of the week such that the sleep tool becomes self aware of when the computing device may be placed into and/or awakened from the sleep mode or hybrid sleep mode. Additionally or alternatively, the sleep tool may be configured to learn over time a path of travel and/or pace of travel of a particular user such that the sleep tool becomes self aware of an amount of time that it may take the particular user to return to the computing device from a particular location.

At step 335, an enablement threshold is calculated and set. For example, once the computing device has been placed in sleep mode or hybrid sleep mode, the sleep tool will proceed to calculate and set an enablement threshold. In embodiments, the enablement threshold is a calculated distance threshold to the computing device that would allow enough time for the computing device to awaken from the sleep mode or hybrid sleep mode and have the programs and/or services that were disabled and/or stopped substantially or completely enable and/or restarted prior to the user of the mobile device arriving at the computing device when the user is returning to the computing device at a certain pace.

For example, the sleep tool may be configured to calculate a distance "d" from the computing device that would allow for the "t" amount of time to pass for the computing device to awaken from the sleep mode or hybrid sleep mode and enable and/or restart the programs and/or services when the user is returning to the computing device at a determined pace of "s" such that the programs and/or services are substantially or completely enabled and/or restarted by the time the user arrives at the computing device. In other words, the distance "d" may be calculated as the "t" amount of time multiplied by the determined pace of "s" (e.g., the distance traveled formula). Thereafter, the sleep tool can set the enablement threshold or distance threshold at distance "d" from the computing device in all directions (e.g., x, y, and z) around the computing device or in predetermined directions (e.g., x, y, and/or z) around the computing device such that the sleep tool can be made aware of when the mobile device is within or outside of the enablement threshold.

In other embodiments, the optional learned behavior of the user from step 330 may be used in the calculation of the enablement threshold (e.g., used to modify the calculated enablement threshold). For example, the sleep tool may be configured to provide for a buffer of "x" amount of time that is added to the "t" amount of time in the calculation of the distance "d" to account for a quicker return of the user to the computing device that is independent of the determined pace "s". Additionally or alternatively, the sleep tool may be configured to calculate the distance "d" given that the user will arrive at the computing device at a set time "y" rather than utilizing the determined pace "s" to determine when the user will arrive at the computing device. It should be understood to those of ordinary skill in the art that the above examples are only illustrative of the various ways in which learned user behavior can be used the improve the systems and process of the present invention, and many other ways of utilizing learned behavior are contemplated without departing from the spirit and scope of the present invention.

At step 340, a determination is made as to whether the one or more mobile devices is within the set enablement threshold. For example, the sleep tool may be configured to compare the location of the one or more mobile devices ascertained in step 320 to the enablement threshold set in step 335 to determine when the one or more mobile devices is within the set enablement threshold. In embodiments, when the location of the one or more mobile devices indicate that the one or more mobile devices is on a side of the enablement threshold that is closer in proximity to the computing device, it is determined that the one or more mobile devices has crossed over the set enablement threshold and is within the set enablement threshold. In contrast, when the location of the one or more mobile devices indicate that the one or more mobile devices is on a side of the enablement threshold that is farther away in proximity to the computing device, it is determined that the one or more mobile devices is outside the set enablement threshold and the process continues to check the location of the one or more mobile devices with respect to the set enablement threshold.

Optionally and alternatively, at step 340, a determination is made as to whether the one or more mobile devices is within the set enablement threshold and whether the one or more mobile devices is traveling towards the computing device. For example, the sleep tool may be configured to compare the location and direction of travel of the one or more mobile devices ascertained in step 320 to the enablement threshold set in step 335 to determine: (i) when the one or more mobile devices is within the set enablement threshold; and (ii) whether the one more mobile devices is traveling towards the computing device.

In embodiments, when the location and direction of travel of the one or more mobile devices indicate that the one or more mobile devices is on a side of the enablement threshold that is closer in proximity to the computing device and the one more mobile devices is traveling towards the computing device, it is determined that the one or more mobile devices has crossed over the set enablement threshold and is traveling towards the computing device within the set enablement threshold. In contrast, when the location and direction of travel of the one or more mobile devices indicate that the one or more mobile devices is on a side of the enablement threshold that is farther away in proximity to the computing device and the one more mobile devices is traveling away from the computing device, it is determined that the one or more mobile devices is traveling away from the computing device in an area outside the set enablement threshold and the process continues to check the location and direction of travel of the one or more mobile devices with respect to the set enablement threshold and the computing device. It should be understood to those of ordinary skill in the art that the above examples are only illustrative of the various ways in which the location and direction of travel can be used the improve the systems and process of the present invention, and many other ways of utilizing the location and direction of travel (e.g., as data predictive of a user's actions) are contemplated without departing from the spirit and scope of the present invention.

At step 345, the power management tool is notified to start enabling/and/or restarting the determined programs and/or services. For example, the awareness of the one or more mobile devices being within the set enablement threshold and, optionally, traveling towards the computing device, will trigger the sleep tool to signal the power management tool in order to awaken the computing device from the sleep mode or hybrid sleep mode and start enabling and/or restarting the programs and/or services determined in step 325 such that the programs and/or services are substantially or completely enabled and/or restarted by the time the user arrives at the computing device. At step 350, upon the user of the one or mobile devices arriving at the computing device, the determined programs and/or services are already substantially or completely enabled and/or restarted on the computing device such that the user can quickly start re-using the programs and/or services.

In embodiments, the invention provides a method that performs the process of the invention on a subscription, advertising, and/or fee basis. That is, a service provider, such as a Solution Integrator, could offer to provide the data collection and a determination that a user is returning to their computing device functionality on a network. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for collecting data and a determination that a user is returning to their computing device functionality on a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented in a computer infrastructure having computer executable code tangibly embodied on a computer readable storage medium having programming instructions operable to:
    activate sleep mode or hybrid sleep mode of a computing device;
    ascertain a location and pace of one or more mobile devices configured to communicate with the computing device;
    determine programs and services that are to be enabled or started upon the computing device waking from the sleep mode or hybrid sleep mode;
    determine a distance threshold to the computing device that allows for a calculated amount of time to pass such that the determined programs and services are enabled or started prior to a user of the one or more mobile devices arriving at the computing device when the user is returning to the computing device at the ascertained pace;
    determine whether the one or more mobile devices is within the determined distance threshold based on the ascertained location of the one or more mobile devices;
    learn a behavior of the user of the one or more mobile devices including each of the user travel path, speed of travel, and planned periods of time away from the computing device; and
    when the one or more mobile devices is within the determined distance threshold, awaken the computing device from the sleep mode or hybrid sleep mode and begin enabling and starting the programs and services.

2. The method of claim 1, wherein the programming instructions are further operable to calculate the amount of time that it will take to enable or start the determined programs and services upon the computing device waking from the sleep mode or hybrid sleep mode; and
    wherein the determining the distance threshold comprises multiplying the calculated amount of time by the ascertained pace of the one or more mobile devices to obtain a distance to the computing device.

3. The method of claim 2, wherein the programming instructions are further operable to set the distance as the distance threshold in all directions or predetermined directions around the computing device.

4. The method of claim 1, wherein the programming instructions are further operable to modify the determined distance threshold based on the behavior of the user.

5. The method of claim 4, wherein the behavior is a set time in which the user is away from the computing device.

6. The method of claim 4, wherein the behavior is a set travel path that the user uses to return to the computing device from a given location.

7. The method of claim 1, wherein the programming instructions are further operable to ascertain a direction of travel of the one or more mobile devices with respect to the computing device.

8. The method of claim 7, wherein the determination of whether the one or more mobile devices is within the determined distance threshold further includes a determination of whether the one or more mobile devices is traveling towards the computing device, and when the one or more mobile devices is within the determined distance threshold and the one or more mobile devices is traveling towards the computing device, the computing device is awaked from the sleep mode or hybrid sleep mode and the programs and services begin enabling and starting.

9. The method of claim 1, wherein a service provider at least one of creates, maintains, deploys and supports the computer infrastructure.

10. The method of claim 1, wherein the programming instructions are further operable to:
    continuously and intermittently check a location of the one or more mobile devices, a pace or a speed of travel of the one or more mobile devices, and a direction of the one or more mobile devices to the computing device;
    cause the computing device to emit an electromagnetic field and a beam of electromagnetic radiation that is used to determine changes or a return signal from the one or more mobile devices; and
    determine which programs and services are disabled during sleep mode or hybrid sleep mode, when to disable those programs and services based on a current processing state of the computing device, and a number and type of programs and services to be stopped.

11. A computer program product for awakening a computing device from a sleep mode or hybrid sleep mode, the computer program product comprising a computer readable storage medium having program instructions embodied therewith, wherein the computer readable storage medium is not a transitory signal per se, and the program instructions are readable by a computing device to cause the computing device to perform a method comprising:
  ascertaining a location and pace of one or more mobile devices configured to communicate with the computing device;
  determining programs and services that are to be enabled or started upon the computing device waking from a sleep mode or hybrid sleep mode;
  calculating an amount of time that it will take to enable or start the determined programs and services upon the computing device waking from the sleep mode or hybrid sleep mode;
  determining a distance threshold to the computing device that allows for the calculated amount of time to pass such that the determined programs and services are enabled or started prior to a user of the one or more mobile devices arriving at the computing device when the user is returning to the computing device at the ascertained pace;
  determining whether the one or more mobile devices is within the determined distance threshold based on the ascertained location of the one or more mobile devices;
  learn a behavior of the user of the one or more mobile devices including each of the user travel path, speed of travel, and planned periods of time away from the computing device; and
  when the one or more mobile devices is within the determined distance threshold, sending a signal to awaken the computing device from the sleep mode or hybrid sleep mode such that the computing device will begin enabling and starting the programs and services.

12. The computer program product of claim 11, wherein the determining the distance threshold comprises multiplying the calculated amount of time by the ascertained pace of the one or more mobile devices to obtain a distance to the computing device.

13. The computer program product of claim 11, wherein the method further comprises:
  learning a behavior of the user of the one or more mobile devices; and
  modifying the determined distance threshold based on the behavior of the user.

14. The computer program product of claim 13, wherein the behavior is at least one of: (i) a set time away from the computing device; and (ii) a set travel path to return to the computing device from a given location.

15. The computer program product of claim 13, wherein the modifying the determined distance threshold comprises adding additional time to the calculated amount of time to account for the behavior of the user.

16. The computer program product of claim 11, wherein the method further comprises that when the one or more mobile devices is outside the determined distance threshold, continuing to ascertain the location and pace of the one or more mobile devices, determine the distance threshold, and determine whether the one or more mobile devices is within the determined distance threshold.

17. The computer program product of claim 11, wherein the method further comprises ascertaining a direction of travel of the one or more mobile devices with respect to the computing device.

18. The computer program product of claim 17, wherein the determination of whether the one or more mobile devices is within the determined distance threshold further includes a determination of whether the one or more mobile devices is traveling towards the computing device, and when the one or more mobile devices is within the determined distance threshold and the one or more mobile devices is traveling towards the computing device, the signal is sent to awaken the computing device from the sleep mode or hybrid sleep mode.

19. A system comprising:
  a CPU, a computer readable memory and a computer readable storage medium;
  program instructions to configure a power management tool of a computing device to place the computing device in a sleep mode or a hybrid sleep mode upon one or more actions occurring;
  program instructions to configure a sleep tool of the computing device to communicate with one or more mobile devices of a user of the computing device;
  program instructions to configure the one or more mobile devices to communicate with the sleep tool;
  program instructions to activate the sleep mode or hybrid sleep mode of the computing device;
  program instructions to ascertain a location and pace of the one or more mobile devices configured to communicate with the computing device;
  program instructions to determine programs and services that are to be enabled or started upon the computing device waking from the sleep mode or hybrid sleep mode;
  program instructions to calculate an amount of time that it will take to enable or start the determined programs and services upon the computing device waking from the sleep mode or hybrid sleep mode;
  program instructions to determine a distance threshold to the computing device that allows for the calculated amount of time to pass such that the determined programs and services are enabled or started prior to the user arriving at the computing device when the user is returning to the computing device at the ascertained pace;
  program instructions to determine whether the one or more mobile devices is within the determined distance threshold based on the ascertained location of the one or more mobile devices;
  program instructions to learn a behavior of the user of the one or more mobile devices including each of the user travel path, speed of travel, and planned periods of time away from the computing device; and
  program instructions to awaken the computing device from the sleep mode or hybrid sleep mode and begin enabling and starting the programs and services when the one or more mobile devices is within the determined distance threshold,
  wherein the program instructions are stored on the computer readable storage medium for execution by the CPU via the computer readable memory.

20. The system of claim 19, wherein:
  the one or more actions are manual activation, user preferences, or by elapsed automatic settings;
  the location and pace of the one or more mobile devices is ascertained using an electromagnetic field or a beam of electromagnetic radiation; and
  the determining the distance threshold comprises multiplying the calculated amount of time by the ascertained pace of the one or more mobile devices to obtain a distance to the computing device.

* * * * *